US010556552B2

(12) United States Patent
Bokor et al.

(10) Patent No.: US 10,556,552 B2
(45) Date of Patent: Feb. 11, 2020

(54) SENSOR DEVICE, SYSTEM, AND METHOD FOR PROTECTING AN OCCUPANT, IN PARTICULAR A DRIVER, OF A VEHICLE FROM A GLARE, AND MOTOR VEHICLE

(71) Applicant: Bayerische Motoren Werke Aktiengesellschaft, Munich (DE)

(72) Inventors: Tamas Gellert Bokor, Munich (DE); Christopher Roelle, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1 day.

(21) Appl. No.: 15/680,784

(22) Filed: Aug. 18, 2017

(65) Prior Publication Data

US 2017/0341599 A1 Nov. 30, 2017

Related U.S. Application Data

(63) Continuation of application No. PCT/EP2016/052976, filed on Feb. 12, 2016.

(30) Foreign Application Priority Data

Feb. 20, 2015 (DE) .................. 10 2015 203 074

(51) Int. Cl.
*G06K 9/00* (2006.01)
*B60R 11/04* (2006.01)
(Continued)

(52) U.S. Cl.
CPC ............... *B60R 11/04* (2013.01); *B60J 3/04* (2013.01); *G06K 9/00791* (2013.01); *G06K 9/209* (2013.01); *G06K 9/4661* (2013.01)

(58) Field of Classification Search
CPC combination set(s) only.
See application file for complete search history.

(56) References Cited

U.S. PATENT DOCUMENTS 4,920,257 A    4/1990  Fuerthbauer et al.
2007/0035114 A1*  2/2007  Breed ............... B60R 21/01536
                                                                        280/735

(Continued)

FOREIGN PATENT DOCUMENTS

DE         198 24 084 A1   12/1999
DE    10 2004 007 521 A1    2/2005
(Continued)

OTHER PUBLICATIONS

International Search Report (PCT/ISA/210) issued in PCT Application No. PCT/EP2016/052976 dated Apr. 6, 2016 with English translation (five pages).

(Continued)

*Primary Examiner* — Alex Kok S Liew
(74) *Attorney, Agent, or Firm* — Crowell & Moring LLP

(57) ABSTRACT

A sensor device is provided for a system for protecting an occupant, in particular a driver, of a vehicle from glare from light sources outside the vehicle. The device includes a projection surface, a shadow-casting object, which is arranged and/or designed such that upon an illumination of an object by a light source located outside the vehicle, at least one shadow of the object is cast onto the projection surface, an image capturing unit that is designed to capture an image of the shadow of the object cast onto the projection surface, and a control unit that is designed to detect at least one property of the at least one light source based on the captured image of the shadow of the object cast onto the projection surface.

20 Claims, 3 Drawing Sheets

(51) Int. Cl.
*B60J 3/04* (2006.01)
*G06K 9/20* (2006.01)
*G06K 9/46* (2006.01)

(56) References Cited

U.S. PATENT DOCUMENTS

2007/0280504 A1* 12/2007 Badawy ............ G06K 9/00711
382/104
2010/0026035 A1   2/2010 Kikuchi
2010/0165099 A1   7/2010 Marchthaler et al.
2011/0133510 A1   6/2011 Zhang

FOREIGN PATENT DOCUMENTS

| | | |
|---|---|---|
| DE | 20 2008 015 177 U1 | 7/2009 |
| DE | 10 2009 020 402 A1 | 2/2010 |
| DE | 10 2012 222 880 A1 | 6/2014 |
| EP | 0 335 056 A1 | 10/1989 |
| JP | 2005-271876 A | 10/2005 |

OTHER PUBLICATIONS

German-language Written Opinion (PCT/ISA/237) issued in PCT Application No. PCT/EP2016/052976 dated Apr. 6, 2016 (five pages).
German Search Report issued in counterpart German Application No. 10 2015 203 074.1 dated Nov. 18, 2015 with partial English translation (12 pages).

* cited by examiner

SENSOR DEVICE, SYSTEM, AND METHOD FOR PROTECTING AN OCCUPANT, IN PARTICULAR A DRIVER, OF A VEHICLE FROM A GLARE, AND MOTOR VEHICLE

CROSS REFERENCE TO RELATED APPLICATIONS

This application is a continuation of PCT International Application No. PCT/EP2016/052976, filed Feb. 12, 2016, which claims priority under 35 U.S.C. § 119 from German Patent Application No. 10 2015 203 074.1, filed Feb. 20, 2015, the entire disclosures of which are herein expressly incorporated by reference.

BACKGROUND AND SUMMARY OF THE INVENTION

The invention relates to a sensor apparatus, a system and a method for protecting an occupant, in particular a driver, of a vehicle from being blinded or dazzled by light sources situated outside of the vehicle. The invention also relates to a motor vehicle having such an apparatus.

The driver of a motor vehicle being blinded or dazzled by external light sources, such as e.g. direct sunlight, sunlight reflections or headlamp lights from other vehicles, may constitute a significant traffic endangerment, particularly if the driver can no longer correctly detect the traffic situation on account of the glare.

DE 198 24 084 A1 has disclosed a glare protection device for a motor vehicle, in which individual matrix elements of a filter disk, embodied in a matrix-like manner, may be darkened such that a darkened region may be produced on the filter disk. The darkened region follows the movement of a glary object and adapts to the glary object in terms of the size and darkening behavior thereof. The glary object is captured with two sensors which are each arranged in the edge region of the filter disk.

It is an object of the invention to provide a sensor apparatus, a system, a method and a motor vehicle, by means of which an occupant, in particular the driver, of the vehicle can be protected from being blinded or dazzled (hereinafter simply "blinded") by light sources situated outside of the vehicle in a simple and reliable manner.

This object is achieved by the sensor apparatus and the method in accordance with embodiments of the invention, and by a system comprising such a sensor apparatus, and by a motor vehicle comprising such a system.

The sensor apparatus according to the invention for a system for protecting an occupant, in particular a driver, of a vehicle from being blinded by light sources situated outside of the vehicle comprises: a projection area; a shadow-casting object, said object being arranged and/or configured in such a way that at least one shadow of the object is cast onto the projection area when the object is illuminated by at least one light source situated outside of the vehicle; an image capturing device which is embodied to capture an image of the shadow of the object cast onto the projection area; and a control device which is embodied to ascertain at least one property of the at least one light source on the basis of the captured image of the shadow of the object cast onto the projection area.

The system according to the invention for protecting an occupant, in particular a driver, of a vehicle from being blinded by light sources situated outside of the vehicle comprises: a darkening apparatus which is embodied to attenuate or shadow light rays which emanate from the at least one light source situated outside of the vehicle and impinge on the occupant; and at least one sensor apparatus according to the invention, wherein the control device is embodied to control the darkening apparatus depending on the at least one ascertained property of the at least one light source.

The motor vehicle according to the invention comprises the system according to the invention. Preferably, the motor vehicle comprises at least one windowpane, in particular a windshield, a rear window and/or a side windowpane, wherein the darkening apparatus is integrated into the windowpane and the sensor apparatus is attached to the inner side of the windowpane facing the interior of the motor vehicle.

Preferably, a motor vehicle within the meaning of the invention is a land vehicle that is not permanently guided on tracks, in particular a road vehicle, for example an automobile, truck or bus. However, in principle, the sensor apparatus according to the invention may be used in all types of vehicles, such as e.g. in aircraft, watercraft and spacecraft as well.

The method according to the invention for protecting an occupant, in particular a driver, of a vehicle from being blinded by light sources situated outside of the vehicle comprises the following steps: producing at least one shadow of an object on a projection area when the object is illuminated by at least one light source situated outside of the vehicle; capturing an image of the shadow of the object cast onto the projection area; ascertaining at least one property of the at least one light source on the basis of the captured image of the shadow of the object cast onto the projection area; and attenuating or shadowing light rays which emanate from the at least one light source situated outside of the vehicle and impinge on the occupant of the vehicle, depending on the at least one ascertained property of the at least one light source.

The invention is based on the approach of providing a sensor apparatus comprising an object that casts shadows, for example one or more patterns, a projection area and an image capturing device for the purposes of determining at least one property of a light source situated outside of the vehicle. The object, the projection area and the image capturing device are arranged relative to one another in such a way and/or configured such that at least one shadow of the object is cast onto the projection area lying behind the object when the object is illuminated by a light source situated outside of the vehicle, for example by the headlamps of an oncoming vehicle, with the image capturing device being directed to said projection area in such a way that it may capture an image of the shadow of the object cast onto the projection area. Properties of the light source, such as e.g. the direction, position, size and/or intensity thereof, are ascertained in a correspondingly configured control device on the basis of the image of the shadow of the object cast onto the projection area, which image has been captured by the image capturing device. On the basis of the properties of the light source ascertained here, it is then possible to control a darkening apparatus, e.g. situated in the region of a windowpane of the vehicle, with e.g. individually actuatable darkening elements in such a way that the former attenuates or shadows light rays which emanate from the light source and impinge on the vehicle occupant. In particular, the darkening apparatus is controlled in such a way here that impingement of the light rays in the region of the eyes of the vehicle occupant is avoided or at least attenuated.

With the aid of the sensor apparatus according to the invention, it is possible to determine the properties of the glary light source situated outside of the vehicle, which are required for reliably controlling the darkening apparatus, in a simple manner. As a result of this, it is possible to protect an occupant, in particular the driver of the vehicle, from being blinded by light sources situated outside of the vehicle in a simple and reliable manner.

In principle, any type of light source comes into question for the light sources situated outside of the vehicle, which may cause blinding of the vehicle occupant. However, in many cases, the light source will be direct or indirect, i.e. reflected, solar radiation or headlamps from other vehicles.

Protecting an occupant of a vehicle from being blinded within the meaning of the invention should be understood to mean any measure by means of which blinding or dazzling of the occupant is avoided or at least reduced.

Preferably, the projection area of the sensor apparatus is a concavely or convexly curved area or a plane area. Alternatively or additionally, the projection area has a substantially homogeneous structure, i.e. no further structures, such as e.g. depressions and/or elevations, are provided in addition to the concave, convex or plane basic form of the projection area. Alternatively or additionally, the color of the projection area is preferably homogeneous. By way of example, the projection area may be uniformly white or light gray. Alternatively or additionally, the projection area is configured as a reflected light image area, on which incident light is reflected in a diffusely scattering manner. However, it is alternatively also possible for the projection area to be configured as a transmitted light image area, in which incident light is transmitted in a diffusely scattering manner. However, in principle, the projection area may have any geometry and/or may be structured or colored inhomogeneously, e.g. patterned. Preferably, a shadow-free calibration image of the projection area is recorded and stored by the image capturing device during a calibration of the sensor apparatus such that said calibration image may be taken into account before analyzing a recorded shadow image of the shadow cast by the illuminated object, for example by subtracting the calibration image from the shadow image.

In principle, any object which is able to produce a shadow on the projection area in the case of light incidence from a light source situated outside of the vehicle may be considered to be a shadow-casting object of the sensor apparatus. The object may have any form and degree of transparency. It is also possible to provide a transparent monochrome or electrochromic display as an object, by means of which static and/or time-varying shadow-casting patterns can be produced. In principle, the object may have one or more shadow-casting elements or patterns such that, as a rule, one or more shadows are cast onto the projection area in the case of illumination by a single light source. Preferably, the shadow-casting elements or patterns may be defined elements, such as e.g. points, lines and/or geometric figures, such as e.g. crosses, circles, ellipses or rectangles. Alternatively or additionally, the shadow-casting object is preferably a static, i.e. temporally unchanging, element, the form, size and/or orientation of which relative to the projection area does not change over time. Thus, if the vehicle equipped with the sensor apparatus according to the invention is moved relative to a light source situated outside of the vehicle, the shadows cast by the object onto the projection area in the process can only change on account of the relative movement between vehicle and light source.

The image capturing device is preferably one or more cameras which are embodied to record static and/or moving images.

Preferably, the control device is embodied to determine at least one direction with which the light from the at least one light source impinges on the sensor apparatus on the basis of a position of the shadow of the object on the projection area. To this end, an image analysis is initially used to determine the position of the shadow on the projection area. In this way, it is possible to determine the orientation of the light source relative to the sensor in a simple and reliable manner.

In a further preferred configuration, the control device is embodied to determine a measure for the size and/or distance of the at least one light source on the basis of the sharpness of the captured image of the shadow of the object on the projection area. Preferably, the sharpness of the shadow in the recorded image is determined first in this case, for example by determining the contrast at the edge boundaries between the shadow region and the illuminated regions on the projection area. This also allows properties of the light source which are required for reliable darkening to be determined in a simple manner.

Preferably, the control device is embodied to determine a measure for the intensity of the at least one light source on the basis of a brightness difference between a region of the captured image situated in the shadow of the object and a region of the captured image situated outside of the shadow of the object. In particular, the determined measure for the intensity is a relative measure for the intensity of the light source. The extent of the respectively required darkening of the incident light can be determined reliably and the darkening apparatus can be controlled correspondingly on the basis of the determined measure for the intensity, despite this simple method of determination.

Further, it is preferable for the control device to be embodied to deduce the presence of a plurality of light sources outside of the vehicle on the basis of a plurality of different shadows of the object cast onto the projection area in the captured image. In particular, the control device is embodied to determine a number of light sources outside of the vehicle on the basis of the different shadows of the object cast onto the projection area in the captured image. The darkening apparatus can be controlled taking into account the determined number of the glary light sources, as a result of which reliable darkening of the light rays emanating from the light sources is achieved.

Preferably, the projection area is configured as a so-called reflected light image area, which is substantially opaque to incident light and reflects the latter in a diffusely scattering manner.

Alternatively or additionally, the projection area may be partly light-transmissive, i.e. the projection area in this case is configured as a so-called transmitted light image area which is at least partly transmissive for incident light and transmits the latter in a diffusely scattering manner.

In the case of configuring the projection area as a transmitted light image area, the image capturing device, which includes a camera in particular, is arranged behind the partly light-transmissive projection area in relation to the direction in which the shadow of the object is cast onto the projection area. As a result of this, the shadow of the shadow-casting object is not influenced by a camera situated between the object and projection area.

When the projection area is configured as a reflected light image area, the image capturing device, which includes a camera in particular, is arranged in front of the projection area in relation to the direction in which the shadow of the object is cast onto the projection area. In this case, images of the projection area may be recorded with particularly high sharpness and brightness.

Preferably, the shadow-casting object is formed, at least in part, by the camera. In this case the camera records its own shadow on the projection area as an alternative or in addition to the shadow of a shadow-casting pattern or element. It is possible to dispense with a separate shadow-casting pattern in this embodiment. If the shadow of the camera is captured in addition to the shadow of a separate pattern, the properties of the light source may be determined particularly accurately therefrom.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
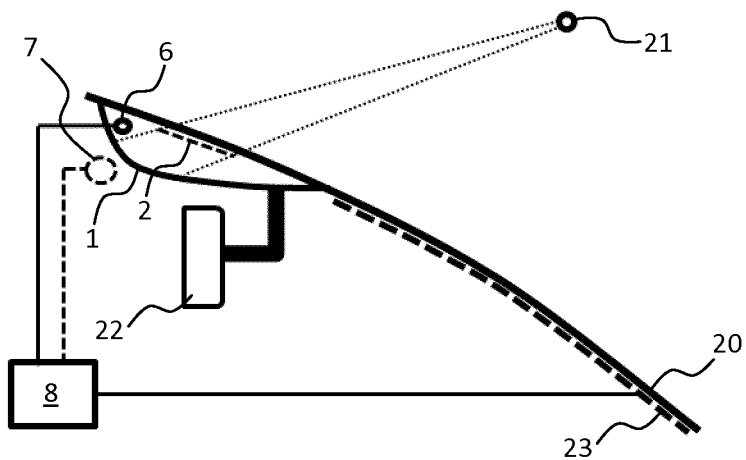
FIG. 1 is a schematic side view of a windshield of a vehicle according to a first example of a sensor apparatus.

FIG. 1 shows a schematic side view of a windshield 20 of a vehicle (not depicted here) according to a first example of a sensor apparatus. The sensor apparatus includes a projection area 1 arranged at the windshield 20 and a shadow-casting object 2 arranged between the projection area 1 and the windshield 20. For reasons of clarity, the object 2 is offset slightly from the windshield 20 and may, in principle, also be arranged or provided on or in the windshield 20 itself. In the depicted example, the projection area 1 has a concave form and a diffusely reflecting surface. Preferably, the surface of the projection area 1 has a light color, such as e.g. white or light gray. In the depicted example, the sensor apparatus is arranged on the windshield 20 in the region above a rearview mirror 22.

If light emanating from a light source 21 situated outside of the vehicle, such as e.g. the sun, impinges on the sensor apparatus, the object 2 which is substantially opaque or partly transmissive in relation to light casts a shadow onto the projection area 1 disposed downstream of the object 2 as seen in the propagation direction of the light. Depending on the configuration of the object 2, for example in the form of one or more patterns, the latter casts one or more corresponding shadows onto the projection area 1. These are captured by a camera 6, which is situated between the projection area 1 and the windshield 20 in the depicted example, said camera only being indicated by a circle for reasons of clarity. The corresponding static or moving camera images are transmitted to a control device 8 and evaluated there. By way of example, a position of the shadow of the object 2 on the projection area 1 is determined in this case and a direction and/or orientation of the light source 21 relative to the sensor apparatus is determined therefrom. Alternatively or additionally, it is also possible to estimate the relative size and/or distance of the light source 21 from the sensor apparatus on the basis of the sharpness of the captured image of the shadow of the object 2 on the projection area 1. Alternatively or additionally, brightness differences between shadow regions and illuminated regions of the projection area may also be determined in the captured image, on the basis of which it is then possible to deduce the intensity of the light source 21.

In the illustrated example, the projection area 1 is preferably configured as a so-called reflected light image area which is substantially opaque to incident light and which reflects the latter in a diffusely scattering manner. However, alternatively or additionally, it is also possible for the projection area 1 to be configured as a so-called transmitted light image area, which is transmissive for incident light and which transmits the light in a diffusely scattering manner. A corresponding image of the shadow of the object 2 cast onto the projection area 1 may also be recorded by a camera 7 in this case, said camera being situated downstream of the projection area 1, as seen in the propagation direction of the light, and only being indicated by dashed lines. Otherwise, the explanations in conjunction with the camera 6 above apply correspondingly to this embodiment.

A darkening apparatus 23 provided in the region of the windshield 20 is controlled on the basis of one or more properties of the light source 21 determined in this manner in such a way that light rays emanating from the light source 21 are attenuated or shadowed by the darkening apparatus 23 in such a way that blinding of the vehicle occupant, in particular of the driver, by the light source 21 is prevented or at least reduced.

Preferably, the darkening apparatus 20 includes a multiplicity of individually actuatable darkening elements, which may be darkened, the light transmissivity of which is modified depending on the determined properties of the light source 21. In particular, there is a reduction in the light transmissivity of those darkening elements which lie along a light path of the light from the light source 21 passing through the windshield in the direction of the eyes of the driver. When determining the relevant darkening elements, use may be made of an image of the eyes or the face of the driver, recorded by a further camera (not depicted here), in addition to the determined light source properties.

Figure 2:
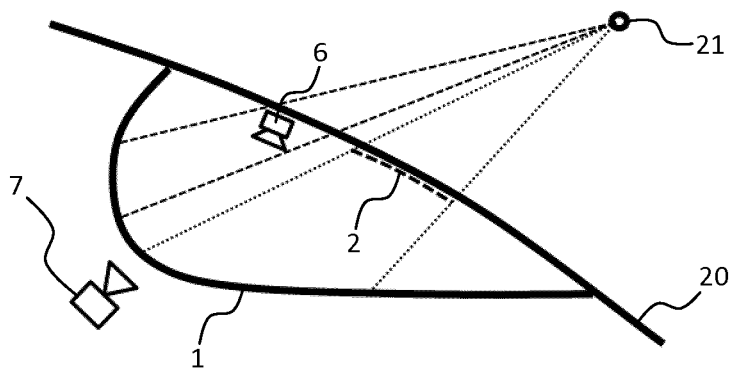
FIG. 2 is a magnified section of the side view shown in FIG. 1.

FIG. 2 shows a magnified section of the side view, depicted in FIG. 1, of the windshield 20 and the sensor apparatus attached thereto, including the projection area 1, the shadow-casting object 2 and the cameras 6 and 7, which may be provided alternatively or together; that is to say, either camera 6 or camera 7, or both cameras 6 and 7 may be provided.

In the depicted example, the camera 6 is shaped and/or arranged relative to the projection area 1 in such a way that the camera 6 itself casts a shadow onto the projection area 1, the image of which may be captured by said camera itself and transmitted to the control device (not depicted here) for further processing. In this embodiment, it is optionally possible to dispense with an additional shadow-casting object 2, such as e.g. the pattern schematically indicated in FIG. 2. However, in principle, it is also possible, as depicted in the example, to use both a shadow-casting object 2, for example in the form of a pattern, and the camera 6 situated between the projection area 1 and the windshield 20 as a shadow-casting object and evaluate both shadows in the recorded image of the projection area 1 in order to ascertain one or more properties of the light source 21 situated outside of the vehicle.

Figure 3:
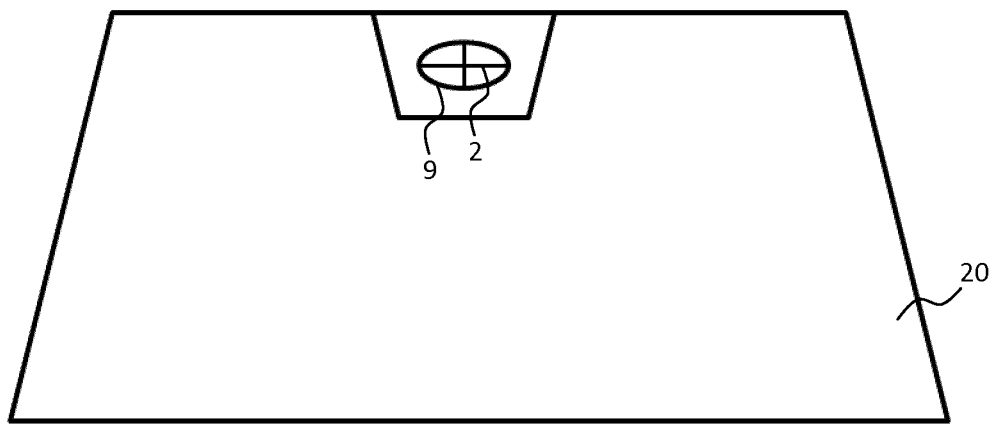
FIG. 3 is a schematic front view of the windshield of a vehicle having a sensor apparatus.

FIG. 3 shows a schematic front view of the windshield 20 of a vehicle having a sensor apparatus which is arranged substantially centrally at the upper edge of the windshield and the shadow-casting object 2 of which has a cross-shaped pattern. In the shown example, the pattern is surrounded by an ellipsoidal edge 9. The concave projection area (not depicted here) lying behind the pattern preferably has the form of a segment of an ellipsoid. However, in principle, this may also have any other form, such as e.g. the form of a segment of a cylinder, a sphere or any other curved area.

Figure 4:
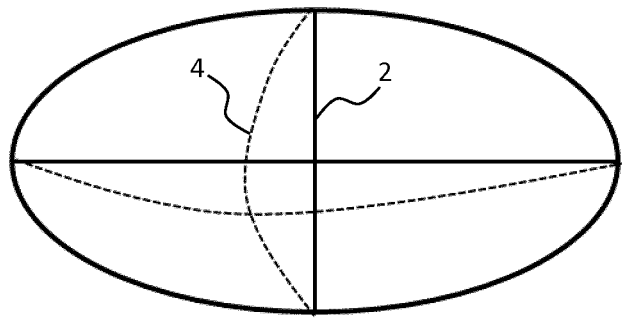
FIG. 4 is an example of a shadow-casting object and a shadow of the object cast onto the projection area.

FIG. 4 shows an example of an object 2 having a cross-shaped pattern and the shadow 4 cast onto the projection area situated behind the object 2 when the object 2 is illuminated by a light source situated in front of the object 2. In the shown example, the projection area (not depicted here) has the form of a segment of an ellipsoid, and so the shadow 4 of the cross-shaped pattern of the object 2 is provided by two crossing, curved lines. After recording an image of the shadow 4 by way of a camera, it is possible to determine properties of the shadow 4, such as e.g. orientation, form, sharpness and/or number of shadows, by way of image analysis. On the basis of the properties of the shadow 4 obtained hereby, it is then possible to derive properties of the light source illuminating the object 2 and, on the basis thereof, control the darkening behavior of a darkening apparatus in such a way that light rays emanating from the light source do not impinge on the eye region of the vehicle occupant, or at least only impinge thereon in a sufficiently attenuated manner.

Figure 5:
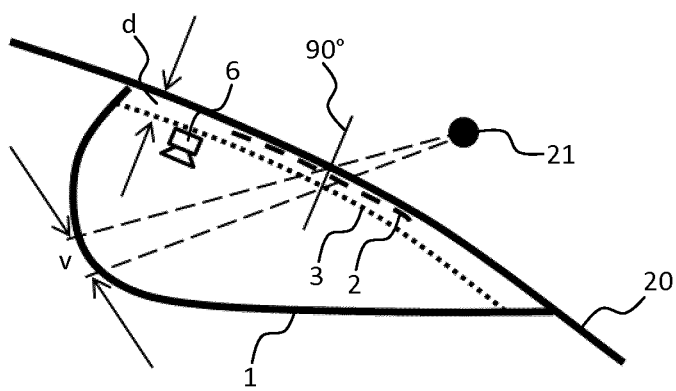
FIG. 5 is a schematic side view of a windshield of a vehicle according to a second example of a sensor apparatus.

FIG. 5 shows a schematic side view of a windshield 20 of a vehicle having a second example of a sensor apparatus which, as a shadow-casting object, comprises a first pattern 2 and a second pattern 3. The first pattern 2 may be provided, for example, on or in the windshield 20, even if it is slightly offset from said windshield 20 in the present case for reasons of clarity. The second pattern 3 is spatially offset from the first pattern 2 by a certain distance d. What the spatial offset of the two patterns 2 and 3 relative to one another achieves is that two points of the first pattern 2 and second pattern 3 which lie behind one another are offset from one another by a certain value v on the projection area 1 in the case of a light incidence on the patterns 2 and 3 which deviates from 90°. That is to say, on account of the two patterns 2 and 3 being arranged offset from one another, correspondingly offset shadows are obtained on the projection area 1 when the patterns are illuminated, said offset shadows depending on the angle of incidence of the rays from the external light source 21.

Figure 6:
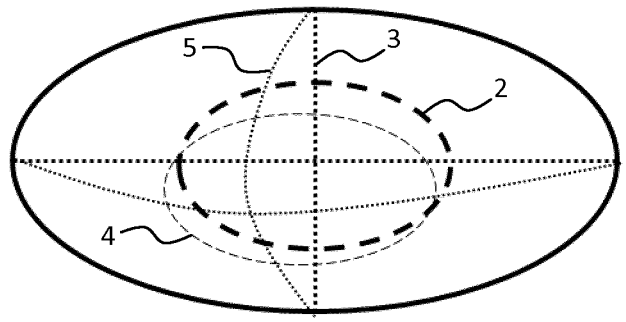
FIG. 6 is an example of the shadows of two offset patterns of a shadow-casting object, cast onto the projection area.

This is elucidated on the basis of FIG. 6, which shows an example of the shadows 4 and 5 cast by two patterns 2 and 3, spatially offset from one another, of a shadow-casting object onto the projection area (not depicted here) lying therebehind. In respect of the form of the projection area, the explanations made above in conjunction with the exemplary embodiment shown in FIG. 4 apply correspondingly.

The first pattern 2 in the shown example is ellipsoid, and so the shadow thereof on the projection area lying therebehind is likewise substantially ellipsoid in the case of illumination by a light source situated in front of the pattern 2. By contrast, the cross-shaped second pattern 3 casts a shadow 5 in the form of crossing, curved shadow lines on the ellipsoidal projection area.

The particular advantage obtained by using a shadow-casting object with two or more shadow-casting elements or patterns and, correspondingly, two or more shadows on the projection area is that it is significantly easier to carry out a calibration of the sensor apparatus than in the case where only one shadow-casting element is used. Inter alia, this is due to the fact that the control device always has two shadows for comparison purposes during the calibration of the sensor and so an image of an "absolute shadow" of a pattern is not required as a result thereof; instead, the relative positions of the cast shadows in relation to one another suffice. This effect increases the robustness of the apparatus in relation to possible relatively small relative movements of the camera, of the shadow-casting object and of the projection area. Moreover, this simplifies the determination of a relative movement between light sources on the one hand and a vehicle on the other hand by virtue of the position of the respectively obtained shadows relative to one another simply being tracked during the image analysis of the respectively captured shadow image. This is advantageous, in particular in conjunction with the use of predictive algorithms for temporally segmented darkening.

Figure 7:
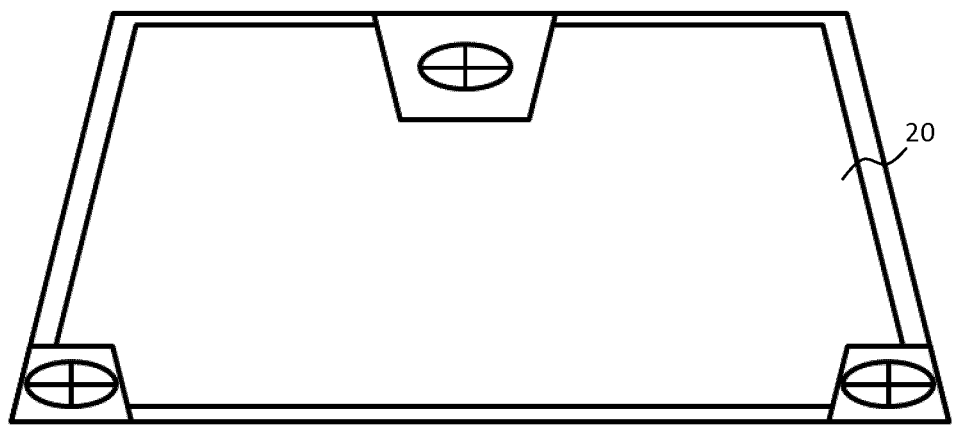
FIG. 7 is a schematic front view of the windshield of a vehicle having a plurality of sensor apparatuses.

FIG. 7 shows a schematic front view of the windshield 20 of a vehicle having a plurality of sensor apparatuses which, in the shown example, are arranged in the region of the center of the upper edge and in the region of the left-hand and right-hand lower corner of the windshield 20 in each case. By arranging two or more sensor apparatuses in different regions, in particular edge regions, of the windshield 20, it is possible to evaluate the respectively captured images and/or properties of the respectively cast shadows derived therefrom together, as a result of which more precise information overall may be determined in relation to the properties of the light sources situated outside of the vehicle. This applies, in particular, to determining the accurate position of the light sources and the movement thereof relative to the vehicle. On the basis of the properties determined in this manner, it is possible to design the darkening of the light rays emanating from glary light sources in an even easier and quicker manner, in particular by using predictive algorithms. Further, the redundancy of the system overall, and hence also the operational reliability, is increased by using a plurality of sensor apparatuses.

LIST OF REFERENCE SIGNS

1 Projection area
2 Shadow-casting object, first pattern
3 Shadow-casting object, second pattern
4 Shadow
5 Shadow
6 Camera
7 Camera
8 Control device
9 Edge
20 Windshield
21 Light source
22 Rearview mirror
23 Darkening apparatus
d Spatial offset of the patterns
v Spatial offset of the shadows The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor apparatus for a system for protecting an occupant of a vehicle from being blinded by light sources situated outside of the vehicle, comprising:

a projection area structure having a curved surface and being disposed inside a cabin of the vehicle;

a shadow-casting object, the object being arranged and/or configured such that at least one shadow of the object is cast onto the projection area structure when the object is illuminated by at least one light source situated outside of the vehicle;

an image capturing device which is configured to capture an image of the shadow of the object cast onto the projection area structure; and a control device which is configured to determine at least one property of the at least one light source on the basis of the captured image of the shadow of the object cast onto the projection area structure.

2. The sensor apparatus as claimed in claim 1, wherein the control device is configured to determine at least one direction with which the light from the at least one light source impinges on the sensor apparatus on the basis of a position of the shadow of the object on the projection area structure.

3. The sensor apparatus as claimed in claim 1, wherein the control device is configured to determine a measure for the size and/or distance of the at least one light source on the basis of the sharpness of the captured image of the shadow of the object on the projection area structure.

4. The sensor apparatus as claimed in claim 1, wherein the control device is configured to determine a measure for the intensity of the at least one light source on the basis of a brightness difference between a region of the captured image situated in the shadow of the object and a region of the captured image situated outside of the shadow of the object.

5. The sensor apparatus as claimed in claim 1, wherein the control device is configured to deduce the presence of a plurality of light sources outside of the vehicle on the basis of a plurality of different shadows of the object cast onto the projection area structure in the captured image.

6. The sensor apparatus as claimed in claim 1, wherein the control device is configured to determine a number of light sources outside of the vehicle on the basis of the different shadows of the object cast onto the projection area structure in the captured image.

7. The sensor apparatus as claimed in claim 1, wherein the projection area structure is partly light-transmissive.

8. The sensor apparatus as claimed in claim 1, wherein the image capturing device comprises at least one camera which is configured to capture the shadow of the object cast onto the projection area structure.

9. The sensor apparatus as claimed in claim 7, wherein the camera is arranged behind the partly light-transmissive projection area structure in relation to the direction in which the shadow of the object is cast onto the projection area structure.

10. The sensor apparatus as claimed in claim 8, wherein the camera is arranged in front of the projection area structure in relation to the direction in which the shadow of the object is cast onto the projection area structure.

11. The sensor apparatus as claimed in claim 10, wherein the shadow-casting object is formed, at least in part, by the camera.

12. A system for protecting an occupant of a vehicle from being blinded by light sources situated outside of the vehicle, comprising:

a darkening apparatus which is configured to attenuate or shadow light rays which emanate from the at least one light source situated outside of the vehicle and impinge on the occupant; and at least one sensor apparatus as claimed in claim 1, wherein the control device is configured to control the darkening apparatus depending on the at least one determined property of the at least one light source.

13. A motor vehicle comprising a system as claimed in claim 12.

14. The motor vehicle as claimed in claim 13, further comprising:

at least one windowpane, wherein the darkening apparatus is integrated into the windowpane, and the sensor apparatus is attached to an inner side of the windowpane facing the interior of the motor vehicle.

15. The motor vehicle as claimed in claim 14, wherein the windowpane is a windshield, a rear window or a side windowpane of the motor vehicle.

16. The sensor apparatus as claimed in claim 1, wherein the occupant is a driver of the vehicle.

17. A method for protecting an occupant of a vehicle from being blinded by light sources situated outside of the vehicle, the method comprising the acts of:

producing at least one shadow of an object on a projection area structure having a curved surface and being disposed inside a cabin of the vehicle when the object is illuminated by at least one light source situated outside of the vehicle;

capturing an image of the shadow of the object cast onto the projection area structure;

determining at least one property of the at least one light source on the basis of the captured image of the shadow of the object cast onto the projection area structure; and attenuating or shadowing light rays which emanate from the at least one light source situated outside of the vehicle and impinge or would impinge on the occupant of the vehicle, depending on the at least one determined property of the at least one light source.

18. The method as claimed in claim 17, wherein the occupant is a driver of the vehicle.

19. The sensor apparatus as claimed in claim 1, wherein the projection area structure is formed as a concave surface when viewed in a direction in which the shadow of the object is cast onto the projection area structure.

20. The sensor apparatus as claimed in claim 1, wherein the shadow-casting object is arranged between the projection area structure and a windshield of the vehicle.

* * * * *